S. JOLLIFF.
GARDEN HOSE SPRAYING NOZZLE SUPPORT.
APPLICATION FILED APR. 22, 1920.
1,367,780.
Patented Feb. 8, 1921.
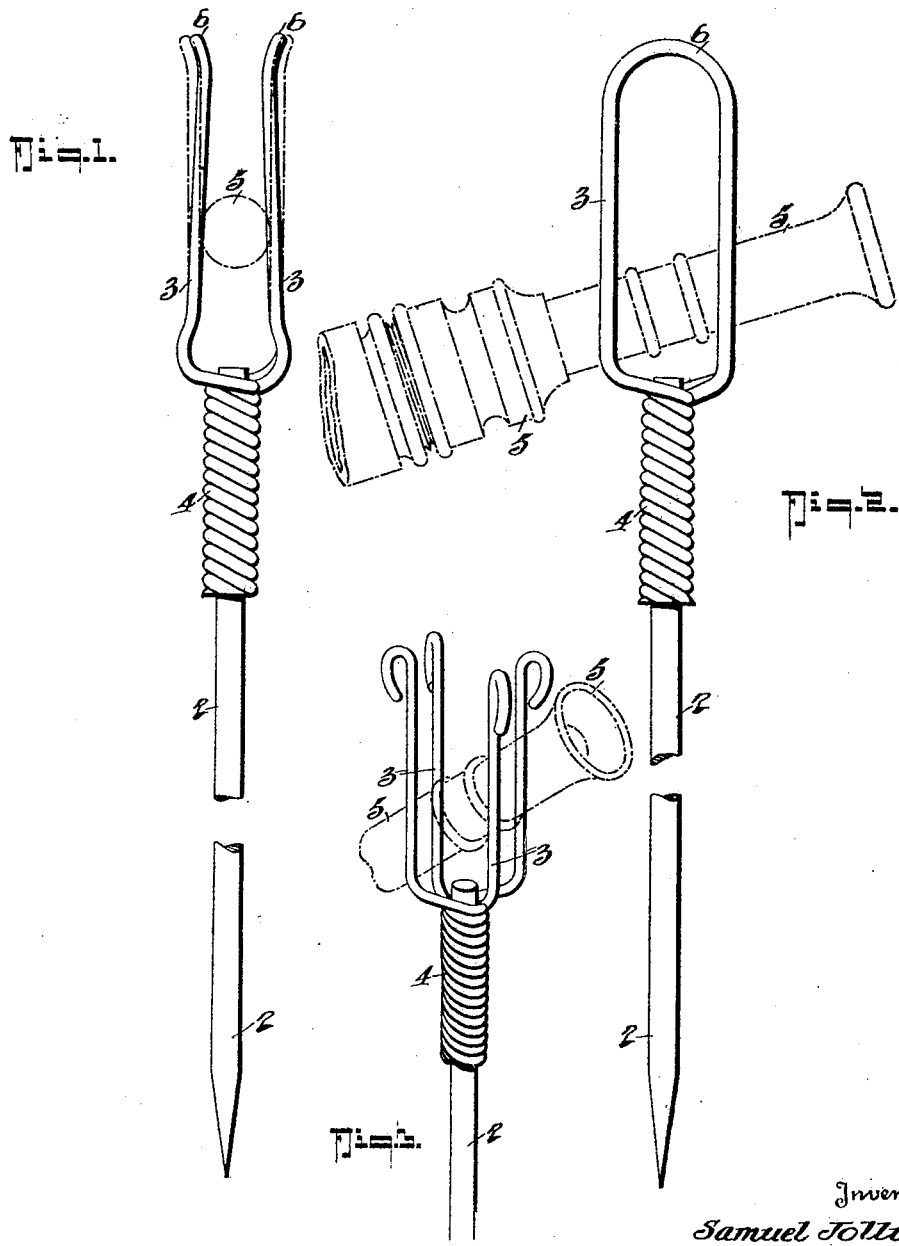
Inventor
Samuel Jolliff

UNITED STATES PATENT OFFICE.

SAMUEL JOLLIFF, OF VANCOUVER, BRITISH COLUMBIA, CANADA.

GARDEN-HOSE SPRAYING-NOZZLE SUPPORT.

1,367,780.   Specification of Letters Patent.   Patented Feb. 8, 1921.

Application filed April 22, 1920. Serial No. 375,799.

*To all whom it may concern:*

Be it known that I, SAMUEL JOLLIFF, citizen of the Dominion of Canada, residing at Vancouver, in the Province of British Columbia, Canada, have invented certain new and useful Improvements in Garden-Hose Spraying-Nozzle Supports, of which the following is a specification.

This invention relates to a support for the spraying nozzle of a garden hose, the object being to provide a simple, inexpensive device that will effectively support the nozzle at any desired inclination, and will allow it to be directed to any horizontal angle around its support in the turf of the lawn.

The invention is particularly described in the following specification, reference being made to the drawings by which it is accompanied, in which:

Figure 1 is a front elevation, and

Fig. 2, a side view of the same, the spraying nozzle being represented by dot and dash lines in each.

Fig. 3 shows in perspective a modified construction of the same device.

In these drawings 2 represents a central stem of light metal rod of any desired length, which rod is pointed at the lower end for insertion into the turf of the lawn.

On the upper end of this stem 2 the ends of two loops 3 of wire are tightly coiled, as at 4, to securely grip the stem and allow the loops to extend above its upper end. Where they project beyond the end of the stem 2, the loops 3 are spread apart parallel to one another to admit between them the body of the nozzle 8, as shown in Fig. 1, and exercise a resilient grip thereon, and the wires of each loop are spread apart from one another a sufficient distance to support the nozzle at any desired position of angular adjustment, as shown in Fig. 2.

The extreme outer end of each loop is outwardly turned, as at 6, in Fig. 1, and the individual wires are outwardly bent before turning into the coil, as shown at 7 in the same figure, so as to better maintain the parallelism of the wires of the loops, when sprung apart on the nozzle.

Instead of being looped as shown in Figs. 1 and 2, the nozzle engaging wires 3 may be separate, as shown in Fig. 3, so that each one is free to exercise its individual resilient grip on the interposed nozzle.

So constructed, the device affords an inexpensive, simple and satisfactory support for the spraying nozzle of a garden hose, which will allow the axis of the nozzle to be directed upward or downward at any desired angle and may be turned to any horizontal angle on the center supporting stem in the turf.

Having now particularly described my invention, I hereby declare that what I claim as new and desire to be protected in by Letters Patent, is:

1. A spraying nozzle support, comprising in combination, a central rod constituting a stem, wires distinct from the stem one end of each of which is coiled tightly with the others on one end of the stem, the free ends of which wires are spread apart to exercise an opposing resilient grip upon a spraying nozzle inserted between them.

2. A spraying nozzle support, comprising in combination, a central rod constituting a stem, wires distinct from the stem bent in loops the separate ends of which wires are closely coiled together on one end of the stem, the looped ends being spread apart to exercise an opposing resilient grip on a spraying nozzle inserted between the loops.

3. A spraying nozzle support, comprising in combination, a central rod constituting a stem, wires distinct from the stem bent in loops the separate ends of which wires are closely coiled together on one end of the stem, the looped ends being spread apart to exercise an opposing resilient grip on a spraying nozzle inserted between the loops, the individual wires of each loop being spread apart from one another.

In testimony whereof I affix my signature.

SAMUEL JOLLIFF.